United States Patent [19]

Schaeffer

[11] 3,994,810
[45] Nov. 30, 1976

[54] ONSTREAM BACKFLUSH FILTER

[75] Inventor: John I. Schaeffer, Towaco, N.J.

[73] Assignee: Brunswick Corporation, Skokie, Ill.

[22] Filed: July 28, 1975

[21] Appl. No.: 599,536

[52] U.S. Cl. ............................. 210/103; 210/108; 210/333 A
[51] Int. Cl.² ...................................... B01D 29/38
[58] Field of Search ........... 210/108, 333, 340, 493, 210/496, 103

[56] References Cited
UNITED STATES PATENTS

| | | | |
|---|---|---|---|
| 2,173,060 | 9/1939 | Andrews | 210/333 |
| 2,834,474 | 5/1958 | Jalkanen | 210/108 X |
| 2,858,024 | 10/1958 | Babcock | 210/108 |
| 2,940,517 | 6/1960 | Skellern | 210/333 X |
| 3,149,070 | 9/1964 | Nash | 21/333 X |
| 3,635,348 | 1/1972 | Carr | 210/333 |
| 3,746,642 | 7/1973 | Bergstrom | 210/496 X |
| 3,853,762 | 12/1974 | Moatti | 210/108 |

OTHER PUBLICATIONS

*Filtering to Advantage*, Boll & Kirch Fitterbau G.m.b.H., Types 174–20 and 174–21, (1974).

*Primary Examiner*—Charles N. Hart
*Assistant Examiner*—Robert H. Spitzer
*Attorney, Agent, or Firm*—John G. Heimovics; David S. Guttman; Sheldon L. Epstein

[57] ABSTRACT

This invention comtemplates a new and novel filtering device that comprises a plurality of parallel filter elements with means within the device for backflushing two or more of the filter elements without removing the elements from the device and while the device is being operated onstream and filtering. The backflushed fluid used to clean the elements is isolated from the primary fluid stream and discharged from the device.

12 Claims, 4 Drawing Figures

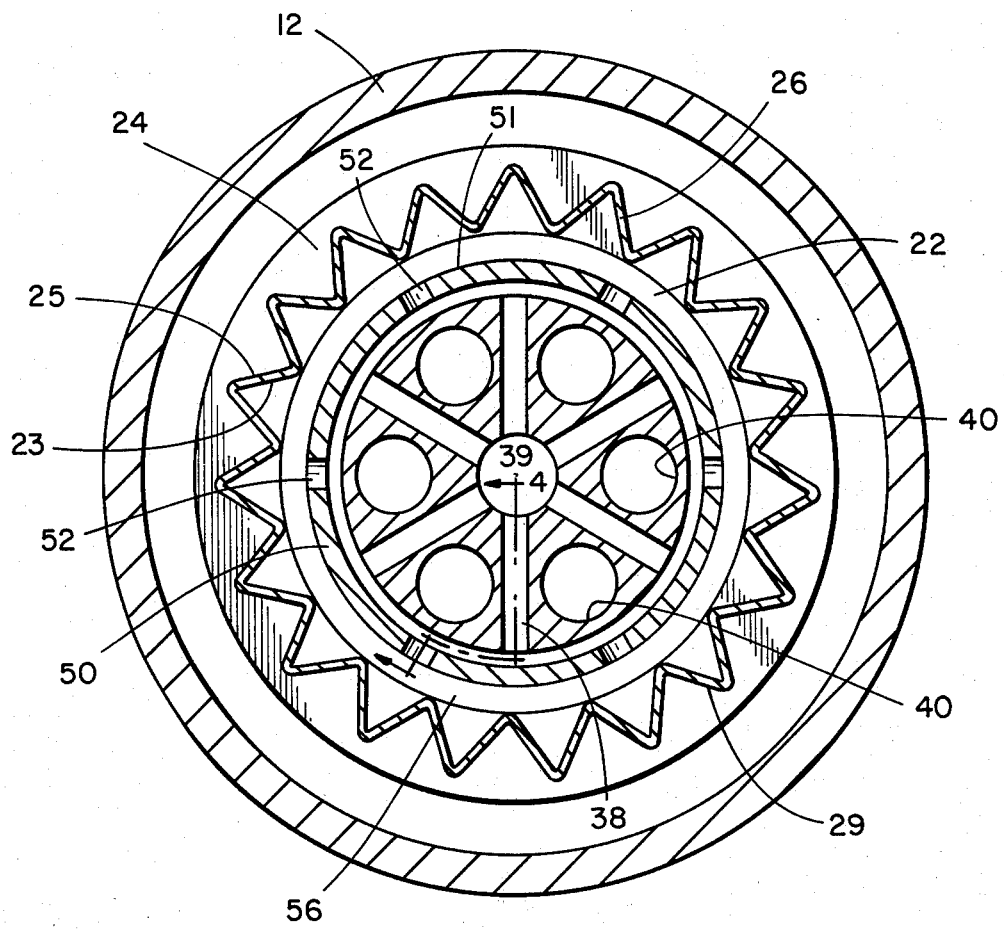
FIG. 2
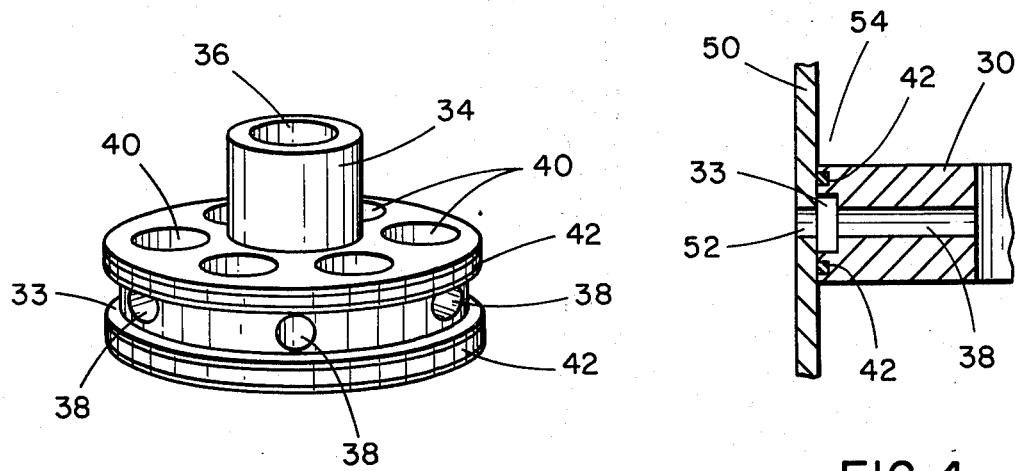
FIG. 3
FIG. 4

ONSTREAM BACKFLUSH FILTER

FIELD OF THE INVENTION

This invention relates to a filtering device, and more particularly, to a backflushable filtering device wherein most of the filtering media is onstream and filtering while the remaining media is being cleaned in situ.

BACKGROUND OF THE INVENTION

Many attempts have been made to utilize filters in a flowing stream and at the same time clean (all or) part of the filters in order that the flowing stream will not be stopped. One prior art system, found in U.S. Pat. No. 2,173,060, teaches an apparatus that backflushes filter elements by regurgitating the entrained particles of the element but does not meet current needs.

Another attempt to provide clean filter elements in a fluid stream is taught in U.S. Pat. No. 3,833,121, wherein two filters are positioned in one housing so that one clean filter is always onstream. When the onstream filter becomes dirty, there are means for transferring the uninterrupted fluid flow to the clean filter. After the flow has been transferred from the dirty filter, the dirty filter is removed from the offstream side of the unit, cleaned and replaced. Although this device works quite satisfactorily, it does not obviate the necessity for removing a filter from the unit and cleaning it separately in an external operation.

Thus, none of the prior art provides a satisfactory method or device to clean part of a filter while onstream and yet remove the dirty contaminates generated during the backflushing cycle completely from the system.

SUMMARY OF THE INVENTION

The invention contemplated and disclosed herein provides a new and novel filtering device that comprises a plurality of parallel operated filter elements with means within the device for cleaning two or more elements at the same time without removing the elements from the device; the device being operated onstream and filtering. The dirty particles entrained in the element are regurgitated into a closed fluid system and completely discharged from the device without contaminating the fluid to be filtered or the filtrate.

Therefore, it is an object of this invention to provide a filter device that periodically backflushes all of its filter elements and disposes of the backflushed or regurgitated, contaminates so that they do not contaminate the input fluid to be filtered or the filtrate.

Another object of this invention is the provision for cleaning several filters at the same time.

A feature of this invention is the provision for the creation of a pressure drop across the filter elements to be cleaned.

Another feature of the invention is the provision for a series of plenum chambers on the backflush circuit to decrease pressure drop loss.

When filtering high viscosity fluids ranging from 200 to 5000 poise, such as polymers and particularly acrylics, polyesters and ethylenes, at elevated temperatures, conventional filter elements must be removed from the filter device to be cleaned. Such filter units include the device taught in U.S. Pat. No. 3,833,121, the well known plate and frame filters, as well as many others. When cleaning filters from units that have been used to filter acrylics, the fumes developed during the cleaning process have been found to be extremely toxic. The new OSHA regulations require that special safety precautions must be taken by individuals (such as wearing breathing masks and protective clothing) and that the filters may only be removed and cleaned in specially ventilated rooms. These requirements make the current filtering devices and their use more complicated and expensive. Thus, another feature of this invention is the provision for providing a filter unit whereby toxic materials may be filtered and the filter elements then cleaned and reused in compliance with the OSHA regulations without the added expense of additional safety equipment.

Additionally, it has been found that the technical significance and purpose of this invention not only makes it possible to clean filter elements while a filter device is operating onstream, but the backflushing circuit is enhanced by use of plenum chambers between the holes or passages to eliminate undesirable pressure drops.

The above and further objects and features will be more readily understood by reference to the following detailed description and the accompanying drawings.

BRIEF DESCRIPTION OF THE DRAWINGS

FIG. 2 is a cross-sectional view taken through the device of this invention;

FIG. 3 is prespective view of a part of the embodiment of this invention; and

FIG. 4 is a cross-sectional view of a portion of FIG. 2 of this invention.

DESCRIPTION OF THE PREFERRED EMBODIMENTS

Figure 1:
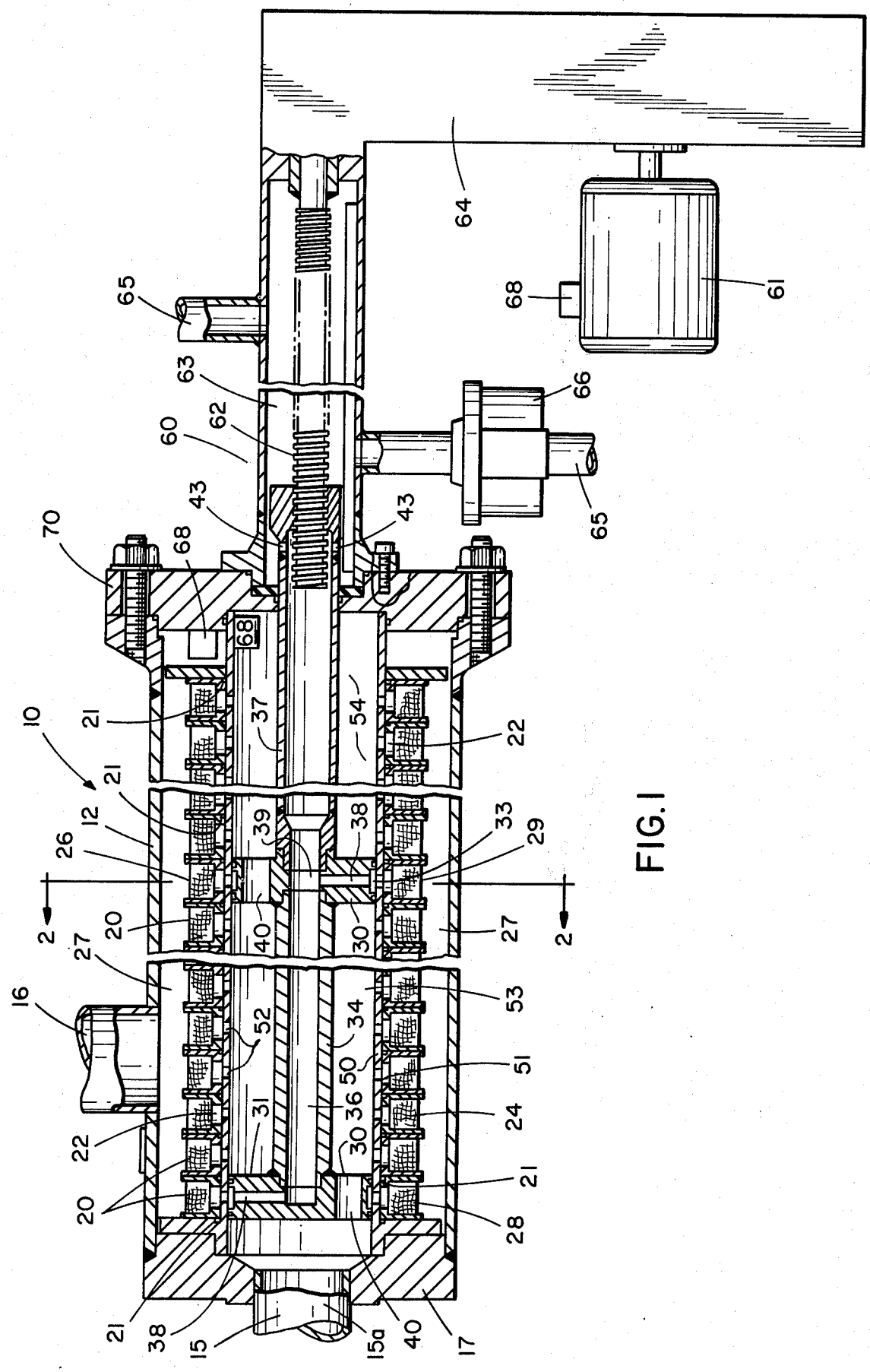
FIG. 1 is a cross-sectional view of the device of this invention.

In a preferred embodiment of this invention, as shown in FIG. 1, a backflushing filter device 10 has a housing 12 with an inlet pipe 15 and an outlet pipe 16. A tubular filter core center post 50 is mounted in the housing and secured by means of low sealing cap 17. The cap 17 is directly connected to the inlet 15 at the inlet passage 15a. A plurality of filter elements 20 are stacked on the external surface 51 of the post 50. Each filter has a pleated filter media material 26, as shown in FIG. 2, an inlet 22 on the internal side 23 of the material 26 and an outlet 24 on the external side 25 thereof. A seal 21 provides a fluid-type connection between the element 20 and the post 50. The post 50 has a plurality of longitudinal radially spaced holes 52 connecting the interior 53 to the exterior 51 of post 50. The holes 52 thereby connect the post interior 53 with a plenum 27 which is adjacent to the external side 25 of the element 20.

Two spaced pistons 30 are slidably mounted in the interior 53 of post 50 and secured to and spaced apart a predetermined distance by a hollow connecting rod 34. The rod 34 has a hollow internal core 36 and is in turn connected to hollow shaft 37. Each piston 30 has longitudinal fluid by-pass passages 40, core connecting holes 38 radially extending to the pistons 30 providing a fluid passage between the piston core hole 39, the core 36 and the plenum chamber 33. On the outside piston 31 the central or core holes 39 and the end of the core 36 of rod 34 are sealed with respect to the inner chamber 54 of the post 50.

The hollow shaft 37 is connected to assembly 60 which moves the shaft 37 and pistons 30 in a predetermined or preselected fashion back and forth within the post 50 by means of screw 62 which is coupled to shaft 37. A fluid cap and seal means 70 seals the end of the filter device 10 and yet provides for the slidable movement of the shaft 37 therethrough. An outlet 65 is connected to the interior 63 of the assembly 60 in such a manner as to permit a fluid path from the piston to the outlet 65. The screw 62 is rotated by coupling means 64 connected to prime mover 61. Connected to the prime mover 61 and inside the plenum 27 is a control and feedback unit 68 which can automatically cycle the backflushing of the filter element 20. The control and feedback unit 68 can be eliminated or overridden, as desired. When in use, unit 68 senses the pressure drop across the filter elements and when it reaches a predetermined level the backflush cleaning cycle is begun.

In operation, a contaminate particle laden fluid enters the inlet pipe 15 under pressure and fills all the void area within the internal chamber 54. With the plenum 27 being at a lower pressure than the inlet 15 the contaminated fluid passes through the filter media 26 of the elements 20 with the contaminated particles being entrained therein. Thus, cleaned filtrate or cleaned fluid fills the plenum 27 and exits through the outlet pipe 16. As the filter media 26 of each element 20 becomes loaded with contaminants or dirt particles, the pressure differential between the inlet 15 and the plenum 27 increases and at the same time the amount of fluid flowing through the device begins to decrease. At a preset pressure differential recognized by the feedback unit 68, the prime mover 61 through the previously described coupling means moves piston 30 opposite filter elements 28 and 29. The sealing piston rings 42 prevent the flow of contaminated fluid through the elements 28 and 29 but the passages 40 permit the contaminated fluid to continue to flow and to the other elements 20. A pressure differential is created at the backflush outlet 65 by any suitable device, for example pump 66, when needed. Since the piston hole 38, the core 36, the interior of shaft 37, the shaft holes 43 and the interior assembly chamber 63 are all connected in a fluid tight arrangement, a low pressure in the outlet 65 will cause a reverse flow of cleaning fluid or filtrate backward through the filter media 26 of elements 28 and 29. This backward or backflushing flow causes the media 26 to give up or regurgitate the contaminated particles entrained therein. The backflush fluid flows backwards through the filter outlets 24, through the holes 52 in post 50, into the undercut piston plenum chambers 33, through the holes 38 into the core 36 which communicates via the shaft 37 and holes 43 to the outlet 65. The time required to clean filters 28 and 29 is dependent upon: (1) how dirty the filters are; (2) the type of fluid in the system; (3) the type of contaminates; (4) the amount of pressure drop in the device; and (5) the desired level of cleanness. The amount of backflushing time can be regulated by the control unit 68 which can be preset to any desired period. Alternatively, the pressure drop sensors, not shown, can be used to indicate when the desired pressure drop across the media during the backflushing cycle has been achieved. They can issue a signal for the unit 68 to cycle. When the elements 28 and 29 have been cleaned, by a preset time, the control unit 68 causes the prime mover 61 to move the piston 30 to the next adjacent elements 20 so that each element may be backflushed and cleaned. Thus, in a progressive and repetitive cycle, all the elements of the filter device 10 may be cleaned with the dirt particles or contaminants withdrawn from the system so that the device 10 can continously filter with the elements being cleaned in place. When toxic materials, such as acrylics, are filtered, the OSHA requirements are fully met without the addition of expensive and now unnecessary safety equipment.

It has been found that the filter media 20 can be made of any porous filter material that can stand the pressure drop of the particular system. In filtering polymers, it has been found preferable to use a metal fiber depth filter media wherein the metal fibers have a diameter of from about 1 micron to about 50 microns and the media sintered. This type of material is sold by the Fluid Dynamics Division of the Brunswick Corporation under the trademark DYNALLOY.

In order to prevent unwanted pressure drop during the backflushing of the elements 20, it has been found preferable to provide a plenum chamber in between the backflush hole passages. Thus, between the elements 20, inlets 22 and the exterior 51 of the post 50 there is a plenum chamber 56. It has, additionally, been found preferable to offset or stagger the piston holes 38 and the core holes 52. The core 39 is connected to the plenum chamber 33 surrounding the piston 30 by the holes 38. Because the width of the plenum 33 is much greater than the holes 52, the sliding travel of the pistons 30 between the longitudinal rows of holes 52 is not required to be extremely precise. Thus, since the movements of the pistons does not have to be with watch maker's precision, the filter device 10 is less expensive to make than other similar type of devices.

The device 10 with sintered metal fiber filter media has been found to be quite desirable for filtering hot or elevated temperature polymers including acrylics, polyesters, and ethylene, but not limited thereto. In fact, such a device can be used to filter fluids having a viscosity range, for polymers, of from about 200 poise to about 5,000 poise. When other less viscous fluids are being filtered, the viscosity range can be from about 1 poise to 200 poise.

In one example wherein the device 10 has 26 filter elements 20 made from DYNALLOY material, acrylic material having a temperature range of from 150°to 170°F and a viscosity ranging from 200–250 poise was introduced at the inlet 15 at 250 psig. The maximum permissable pressure drop across the device was 100 psi but the unit operated with an outlet 16 pressure of 200 psig. Thus, there was a 50 psi pressure drop across the filter elements 20 with the plenum 27 exhibiting a 200 psig fluid pressure. Because of such a high pressure in the plenum 27, the pump 66 was not used and the assembly outlet 65 was maintained at atmospheric pressure. Thus, a 200 psig pressure drop or pressure drop induced surge for backflushing of the filter elements 20 was present. It was found that this was more than sufficient to clean the filter elements in a very short period of time and the cleaning cycle took place only on a periodic basis. From this example it would be obvious to those skilled in the art that the pressure drop in the plenum 27 determines whether or not the pump 66 is used.

Alternatively, the pistons 28 and 29 can be staggered so that only one element is cleaned at a time, rather than two at the same time, thereby requiring a smaller amount of clean fluid, at a time, to backflush.

Although specific embodiments of the invention have been described, many modifications and changes may be made in the device without departing from the spirit and the scope of the invention as defined in the appended claims.

What is claimed is:

1. A device capable of removing undesirable contaminates from a contaminant laden fluid comprising:
   a. a housing having an inlet and an outlet;
   b. a post mounted within the housing with the interior sealably connected to the inlet, the post having a plurality of longitudinal rows of radially spaced holes connecting the interior with the exterior of the post;
   c. a plurality of filter elements, each having an inlet and an outlet, with a filter material placed therebetween, the elements mounted on the post with the inlet operatively aligned with the post holes, the material functioning to remove the contaminants as the fluid passes therethrough;
   d. at least two pistons secured to a hollow connecting rod and slidably mounted in the interior of the post, each piston having longitudinal by-pass passages and radially spaced post connecting holes arranged to provide a fluid passage from the filtering element inlets to the connecting rod core;
   e. a fluid plenum surrounding the elements within the housing for channeling clean fluid to the outlet;
   f. means for positioning the pistons adjacent to spaced filter elements and means for providing a pressure in the connecting rod less than the pressure in the plenum to permit the cleaned fluid to backflush the spaced element;
   g. a backflush assembly secured to the housing and partially surrounding said means for positioning;
   h. means associated with the positioning means for removing the contaminated backflushing fluid through the connecting rod into the backflush assembly without contaminating the cleaned fluid; and
   i. means capable of introducing solvent into the backflush outlet assembly without interrupting the filtering.

2. The device of claim 1 further including means for progressively cleaning all of the elements in the device one at a time.

3. The device of claim 2 further including means for sensing when the filter elements need to be cleaned.

4. The device of claim 2 wherein the pistons are positioned to permit all the filter elements to filter at the same time.

5. The device of claim 1 wherein the piston has an annular plenum that aligns with the post connecting holes.

6. The device of claim 1 wherein the filter material is a sintered material fiber product.

7. The device of claim 6 wherein the metal fibers have a diameter of from 1 to 50 microns.

8. The device of claim 1 wherein the fluid being filtered is acrylic polymer having a viscosity of approximately 200–250 poise and the pressure in the plenum is about 200 psig.

9. The device of claim 1 further including a hollow shaft connected to the connecting rods so that the backflush fluid exits from an outlet associated with the positioning means.

10. The device of claim 1 further including means for adjusting the time duration that each element is backflushed.

11. The device of claim 1 further including means for progressively cleaning all the elements in the device, two at a time.

12. The device of claim 1 including means for introducing a solvent into the backflush assembly to permit solvent cleaning of the drive mechanism in the assembly and the filter elements without disassembly of the device.

* * * * *